C. T. CUTLIP.
BACKSTAY FOR VEHICLE TOPS.
APPLICATION FILED MAY 20, 1912.
1,119,247.
Patented Dec. 1, 1914.
2 SHEETS—SHEET 1.
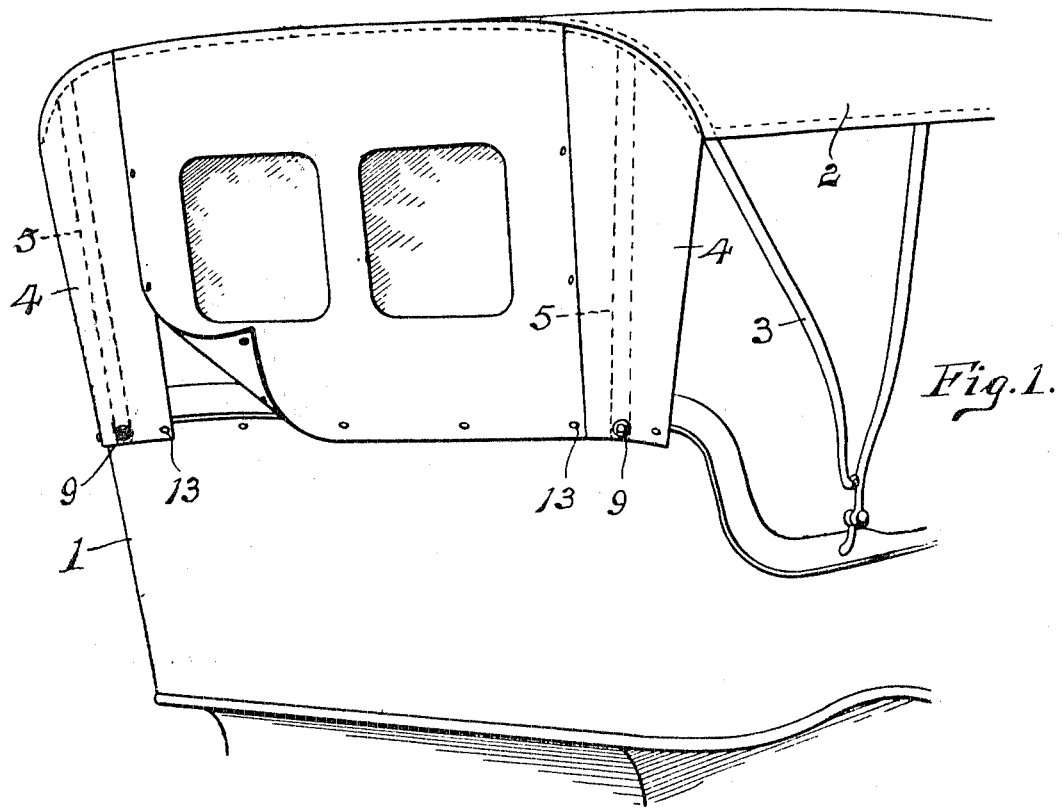
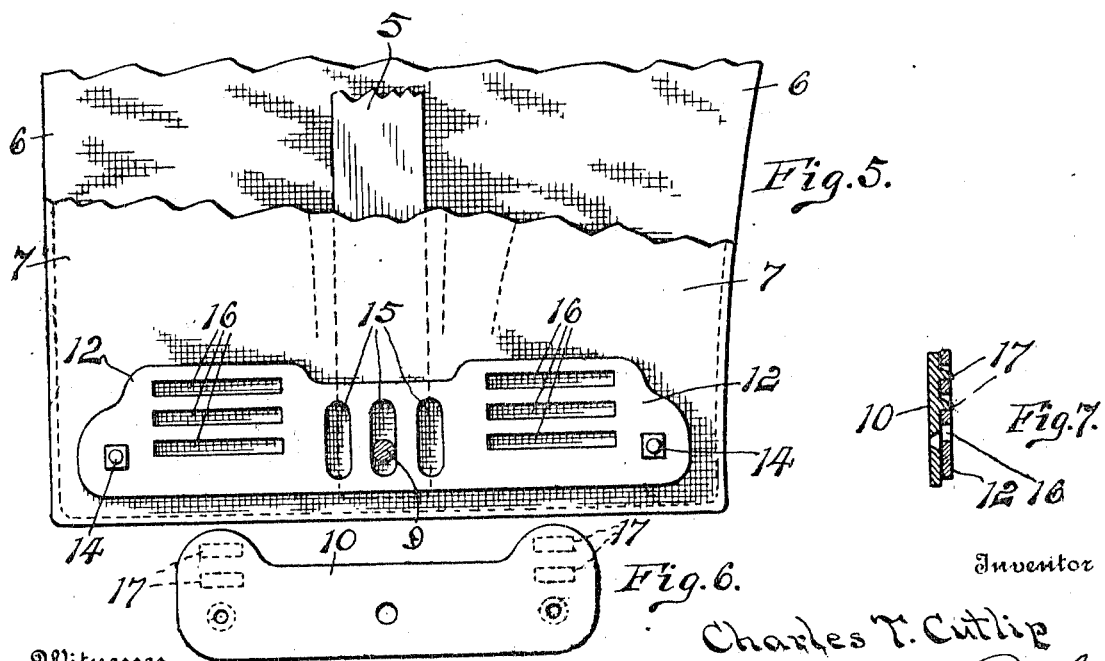
Witnesses
A. M. Shannon
Chas. W. Stauffiger
Inventor
Charles T. Cutlip
By
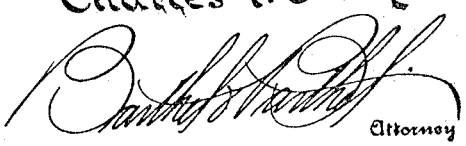
Attorney C. T. CUTLIP.
BACKSTAY FOR VEHICLE TOPS.
APPLICATION FILED MAY 20, 1912.
1,119,247.
Patented Dec. 1, 1914.
2 SHEETS—SHEET 2.
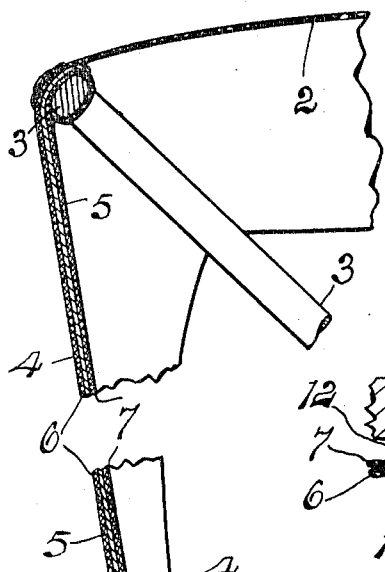
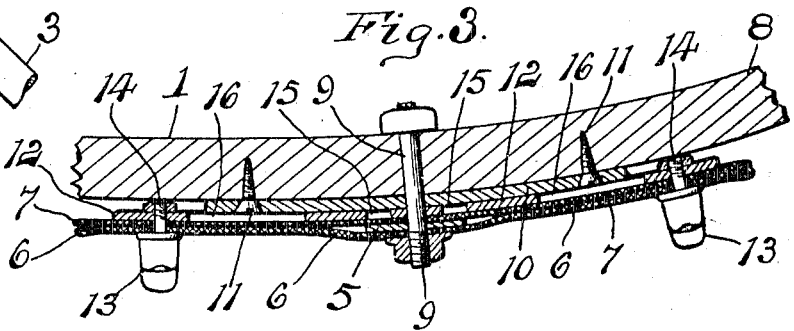
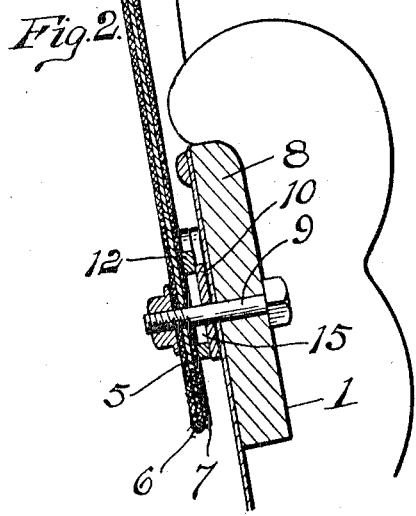
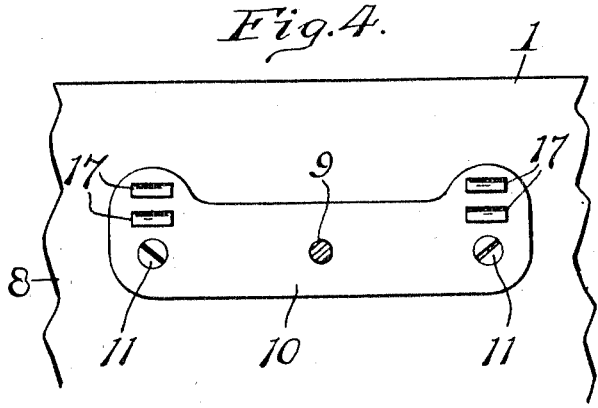
Witnesses
A. M. Shannon
Chas. W. Stauffiger
Inventor
Charles T. Cutlip
By
Attorneys

UNITED STATES PATENT OFFICE.

CHARLES T. CUTLIP, OF DETROIT, MICHIGAN.

BACKSTAY FOR VEHICLE-TOPS.

1,119,247.   Specification of Letters Patent.   Patented Dec. 1, 1914.

Application filed May 20, 1912. Serial No. 698,470.

*To all whom it may concern:*

Be it known that I, CHARLES T. CUTLIP, a citizen of the United States of America, residing at Detroit, in the county of Wayne and State of Michigan, have invented certain new and useful Improvements in Backstays for Vehicle-Tops, of which the following is a specification, reference being had therein to the accompanying drawings.

This invention relates to improvements in vehicle tops and more particularly to a back stay for such tops.

The object of the invention is to provide a concealed tension member for the back stay and simple and efficient means for attaching the back stay to the seat back which will permit of the adjustment of the stay both laterally and vertically in securing the same in place, and further to provide certain other new and useful features in the construction and arrangement of parts.

To these ends the invention consists in the matters hereinafter set forth and more particularly pointed out in the claims, reference being had to the accompanying drawings, in which—

Figure 1 is a perspective view of a vehicle top embodying the invention; Fig. 2 is an enlarged vertical section through a portion of the top and back stay fastening embodying the invention; Fig. 3 is a horizontal section through the back stay fastening; Fig. 4 is an elevation of the fastening plate; Fig. 5 is an elevation of the adjusting bar showing the same secured in place upon the lower end of the back stay; Fig. 6 is an elevation of the inner side of the fastening plate; and Fig. 7 is a sectional detail of the fastening plate and adjusting bar in interlocked position.

In the drawings 1 represents the seat back of an automobile body and 2 a vehicle top of the usual construction as applied to automobile bodies, having a bow 3 which is attached at its lower ends to the side arms of the seat and extends across the top forming the rear corner or end thereof to which the two back stays 4 are attached at their upper ends. These back stays are each formed of two or more thicknesses of fabric with a thin metal strip 5 laid in between the outer layer of fabric 6 and the inner lining 7. This strip of metal is secured in any desired manner at its upper end to the bow 3 and extends downward longitudinally of the back stay to give the necessary strength to the stays and prevent any undue strain from being put upon the fabric when the top is raised and secured in position in the usual manner of holding automobile tops.

The lower end of each back stay is secured to the seat back 1 by providing the top rail 8 of the seat with a bolt 9 which extends therethrough and projects outwardly therefrom. A fastening plate 10 of a suitable length and size and curved to fit the curve of the outer surface of the seat back, is secured upon said surface by means of screws 11 with the bolt 9 projecting through an opening in the plate. Secured upon the inner side of the back stay against the lining 7 is an adjusting plate 12. This plate is held in place upon the back stay by means of the usual knobs or buttons 13 which are provided for attaching a side curtain (not shown) and a back curtain to the back stay at its lower end. These buttons are each provided with a screwthreaded shank 14 which extends through the two thicknesses of fabric and through a hole provided therefor in the end of the plate or bar 12. In manufacturing the vehicle top, this adjusting bar is secured in proper relation to the back stay before the top is attached to the vehicle body. Intermediate its ends, the bar 12 is provided with a plurality of vertical slots 15 to receive the bolt 9, said bolt being passed through one of these slots and through a hole in the lower end of the tension strip 5 when the back stay is attached to the seat back. Each bar 12 is also formed with a series of horizontal slots 16 near each end at each side of the vertical slots 15 and to engage the slots 16 the plate 10 is provided with a plurality of lugs 17 at each end.

In adjusting and attaching the vehicle top to the seat back, the back stays with the adjusting bars secured thereto, are preferably stretched and adjusted to the back and the hole to receive each bolt 9 is then made in the fabric and the lower end of the tension strip 5 in proper position to secure the back stay in the place to which it is adjusted, said adjustment both vertically and laterally of the stay being permitted by the slots 15 and 16, the vertical adjustment being provided for by the vertical slots 15 through any one of which the bolt 9 may be inserted, and the lateral adjustment being provided for by the slots 16 which permit the plate 12 to be moved upon the plate 10 with the lugs 17 projecting through the slots. When the proper location of the hole for the bolt 9 has been thus determined and the hole made in the back stay, the bolt is passed therethrough and the bar 12 brought into contact with the plate 10 which has been properly secured to the seat back when the body is made and finished. The lugs 17 on the plate 10 are thus engaged with the slots 16 on the bar and take the pull or strain from the side portions of the back stay. The tension strip 5 being directly secured at its lower end to the bolt 9, forms a direct connection between the seat back and the bow 3 of the vehicle top to take the main strain of the top.

In this construction the back stays may be quickly and easily attached to the seat back and the proper adjustment readily secured by reason of the securing plate and adjusting bar which may be moved one upon the other to secure the desired adjustment of the stay.

The thin metal strip 5 forms a very strong, light and flexible tension member which will not stretch and which is wholly concealed within the back stay where it is out of the way and is protected by the fabric.

Obviously, changes may be made in the construction and arrangement of parts without departing from the spirit of my invention and I do not wish to limit myself to the particular form or arrangement shown.

Having thus fully described my invention what I claim is:—

1. In a back stay for vehicle tops, the combination with a bow and fabric strips secured at their upper ends to said bow, of a thin flexible non-expansible metallic tension strip secured at its lower end to said bow and extending longitudinally of the fabric strips between the same, and means secured to the fabric strips and capable of lateral adjustment relative to said tension strips for adjustably securing the end of said tension strip to a vehicle body.

2. A back stay for vehicle bodies comprising a stay strip, a member secured to the lower end of said strip and having slots formed therein, a body fitting of less length than the slots of said member, means on said fitting to interlock with said member and adapted to be adjusted laterally of the strip upon said fitting, and means for securing the member to the fitting in adjusted position.

3. A back stay for vehicle tops comprising an inner and an outer fabric strip, a tension strip of sheet metal extending longitudinally of and between the fabric strips, a slotted member extending transversely of said strips and secured thereto at their lower ends and capable of lateral adjustment relative to said tension strip, means adapted to engage in said slotted member to temporarily hold the same, and means passing through said fabric strips, tension strip and member for permanently securing the same to a vehicle body.

4. In a back stay, the combination with a stay strip, an adjusting member provided with a plurality of vertical and horizontal slots, means for securing the member to the stay strip, a body member, lugs on the body member to engage the horizontal slots, and a bolt extending from the body member through one of the vertical slots in the adjusting member to secure said member to the body member.

5. In a back stay, the combination of fabric stay strips, a flexible metal tension strip interposed between the fabric stay strips, an adjusting bar having a plurality of vertical slots intermediate its ends and a series of horizontal slots near each end, means for securing said adjusting bar to the lower ends of the stay strips, a body plate, lugs on the body plate to engage the horizontal slots in the bar, and a bolt extending from the body plate through one of the vertical slots in the bar and through the lower end of the tension strip and stay strips.

6. In a curtain tightener for vehicles, an upper support, a curtain secured to said upper support, a metal strap secured at one end to the upper support and at its other end connected to the curtain near the bottom of the latter, a lower support, a locking plate secured to the lower support having transverse notches, a correspondingly notched plate contacting with the locking plate and secured to the strap on the inner side of the curtain, and means for clamping the two plates together.

7. In a curtain tightener for vehicles, an upper support, a curtain, a plate, a metal strap secured at one end to the upper support and at its other end to said plate near the bottom of the curtain, said plate being secured to the curtain near the bottom of the latter and said plate having transverse projections, a lower support, a locking plate secured to the lower support having transverse notches to receive the projections of said plate on the strap, a bolt extending through said locking plate, said first plate having a vertical slot through which said bolt is projected, and means coöperating with the bolt for clamping the plates together.

8. In a back stay for vehicle tops, the combination with a vehicle body and a back stay, of means longitudinally disposed upon said vehicle body for temporarily holding said back stay, means carried by said back stay to receive the means of said body whereby said back stay can be laterally shifted relative to said body, and means for permanently securing said back stay in adjusted position.

In testimony whereof I affix my signature in presence of two witnesses.

CHARLES T. CUTLIP.

Witnesses:
    OTTO F. BARTHEL,
    ANNA M. DORR.